United States Patent
Cohen et al.

(10) Patent No.: US 7,155,625 B2
(45) Date of Patent: Dec. 26, 2006

(54) METHOD AND APPARATUS TO MODIFY POWER REQUIREMENTS FOR A SYSTEM

(75) Inventors: Paul M. Cohen, Beaverton, OR (US); Christopher A. Meredith, Beaverton, OR (US); Ronald J. Child, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 09/852,432

(22) Filed: May 9, 2001

(65) Prior Publication Data

US 2002/0194517 A1 Dec. 19, 2002

(51) Int. Cl.
*G06F 1/28* (2006.01)

(52) U.S. Cl. ................ 713/340; 713/322; 713/323

(58) Field of Classification Search ........ 713/300, 713/321, 323, 324, 340; 323/234, 304, 318; 324/522, 771
See application file for complete search history.

(56) References Cited

U.S. PATENT DOCUMENTS

| | | | |
|---|---|---|---|
| 5,483,656 A * | 1/1996 | Oprescu et al. ............. 713/320 |
| 5,804,894 A * | 9/1998 | Leeson et al. ............... 307/130 |
| 5,991,883 A * | 11/1999 | Atkinson ...................... 713/300 |
| 6,167,524 A * | 12/2000 | Goodnow et al. ........... 713/300 |
| 6,266,776 B1 * | 7/2001 | Sakai ........................... 713/300 |
| 6,304,823 B1 * | 10/2001 | Smit et al. .................... 702/60 |
| 6,353,894 B1 * | 3/2002 | Pione ........................... 713/340 |
| 6,453,198 B1 * | 9/2002 | Torgerson et al. ............ 607/29 |
| 6,574,740 B1 * | 6/2003 | Odaohhara et al. ......... 713/323 |
| 6,594,771 B1 * | 7/2003 | Koerber et al. ............. 713/340 |
| 6,687,839 B1 * | 2/2004 | Tate et al. ................... 713/324 |
| 6,802,014 B1 * | 10/2004 | Suurballe ..................... 713/300 |

FOREIGN PATENT DOCUMENTS

| | | | |
|---|---|---|---|
| JP | 2000222074 A | * | 8/2000 |
| JP | 2000330945 A | * | 11/2000 |

* cited by examiner

*Primary Examiner*—Thuan Du
(74) *Attorney, Agent, or Firm*—Kacvinsky LLC; John F. Kacvinsky

(57) ABSTRACT

A method and apparatus to modify power levels for devices in a system in response to changes in power conditions is described. A power level of a power supply providing power to a plurality of devices is monitored. A change in the power level of the power supply is detected, a modification signal is created to modify the operating power level of at least one of the plurality of devices and the modification signal is sent to the device.

19 Claims, 4 Drawing Sheets

METHOD AND APPARATUS TO MODIFY POWER REQUIREMENTS FOR A SYSTEM

BACKGROUND

A system may comprise a plurality of components, with each component having a certain power requirement. This power requirement may be in the form of an operating voltage, which is typically expressed in the form of volts. For example, the typical operating voltage of a Pentium® III processor made by Intel® Corporation may be 1.6 volts. The power may be received from a shared system power supply that may provide power in the form of alternating current (AC) or direct current (DC). The system power supply may in turn receive its power from a larger power provider, such as a power generation grid or bank of batteries.

Power conditions for the system power supply and the larger power provider may change over time. For example, demand for power from the larger power provider may increase, thereby reducing the amount of available power to the system power supply. It may be desirable, therefore, to change the power requirement for one or more devices within a system using power from the system power supply in response to a change in power conditions.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Figure 1:
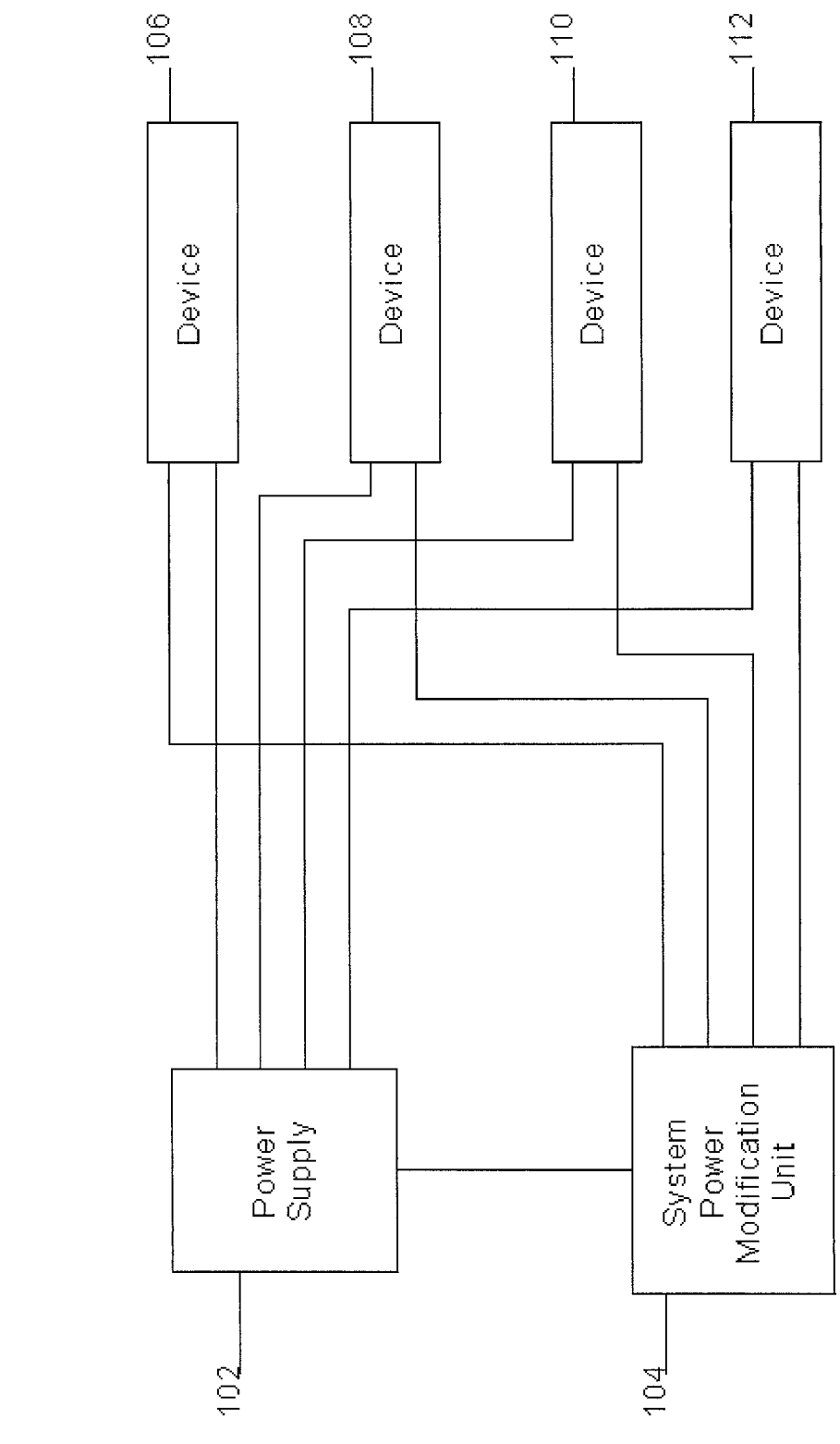
FIG. 1 is a system suitable for practicing one embodiment of the invention.

In the following detailed description, numerous specific details are set forth in order to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention.

A typical system may comprise a number of electronic devices or components that operate at certain operating power levels. Further, the devices may draw power from a common power supply. This may be the case, for example, when a number of network devices are stored in the same physical rack. The proximity and power requirements for each device may facilitate the use of the single power supply, with each device having its own power connection to the system power supply. The system power supply may in turn be connected to a larger power supply, such as a plug providing AC power from a power generation grid or a bank of batteries providing DC power.

A problem may occur, however, whenever there are changes in power levels provided by the power supply, either at the system level power supply or the larger power supply. This typically occurs whenever the demand for power increases dramatically in an area serviced by the larger power supply. Demand may increase, for example, during the summer months due to an increase in the use of air conditioners that may draw power from a common power generation grid. The increase in demand may sometimes create a condition referred to as a power "brownout" or "blackout," where certain areas are left without power or reduced power. A reduction in the larger power supply may cause a reduction in the system power supply. A reduction in the system power supply may in turn affect performance of the entire system, including each device connected to the system power supply. For example, the reduction in power may cause the power provided to some or all of the devices connected to the system power supply to fall below the operating power levels of such devices, thereby causing the devices to potentially shut down. This shut down may occur to the entire system or parts of the system randomly, and without any regard to the functions provided by each respective device. Furthermore, the shut down may occur to the entire system, even though the reduction in power is still sufficient to power each device at a lower power level, or a subset of system devices at the same or lower power levels.

The embodiments of the invention comprise a method and apparatus to modify power requirements for a system based on power conditions. In one embodiment of the invention, a system power modification unit may monitor the power level of a system power supply and modify the operating power levels for various devices within the system based on changes to the power supply power level. In one embodiment of the invention, the system power modification unit may comprise a power sensor and a power modification signal generator. The power sensor may monitor the power levels of the power supply. The power modification signal generator may generate a modification signal to modify the operating power levels of one or more devices within the system in accordance with changes detected by the power sensor. A device power modification unit may receive the modification signal, and modify the operating power levels of a device in accordance with the modification signal. The amount of modification may vary, and may be indicated by the modification signal itself, or by a value for each of the system devices as stored in a power table.

As a result of this embodiment of the invention, the operating power levels for one or more devices within the system may be lowered to compensate for the lower power levels from the system power supply. Furthermore, the amount of reduction may be regulated for each device or the system as a whole. In the event the power supply power levels are reduced to the point where some system devices need to be turned off, the embodiments of the invention may turn off each device in accordance with a priority level assigned each device. In this way those devices performing the most critical system functions may continue to provide those critical functions until system power levels either return to normal levels or force the entire system to shut down.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Referring now in detail to the drawings wherein like parts are designated by like reference numerals throughout, there is illustrated in FIG. 1 a system suitable for practicing one embodiment of the invention. FIG. 1 is a block diagram of a system comprising a power supply 102, a power modification unit 104, and a plurality of electronic devices 106, 108, 110 and 112. Electronic devices may include any type of device that consumes or requires power. In one embodiment of the invention, electronic devices may include, for example, network devices, such as servers, network appliances, routers, switches, gateways, bridges, telephony, network processors, and so forth. Additional devices may comprise, for example, personal computers (PC), storage devices such as hard drives and optical drives, memory, specialized processors, network interface cards (NICs), physical interface cards (PICs) or any other electronic device or component that consumes power. Examples of additional systems other than system 100 that may be suitable for use with one or more embodiments of the invention may include a storage area network (SAN), local area network (LAN), wide area network (WAN), metropolitan area network (MAN), a server farm, multiple servers or other systems having a plurality of devices sharing the same power supply. Power supply 102 is connected to system power modification unit 104, and both are connected to each of devices 106, 108, 110 and 112, respectively.

In operation, each device 106, 108, 110 and 112 has an operating power level. The operating power level for each device may be the same or different from the other devices. Each device draws power from power supply 102 according to its particular operating power level requirements.

System power modification unit 104 monitors power supply 102 for changes in power levels. If system power modification unit 104 detects a change in power levels for power supply 102, it may generate a modification signal. The modification signal may indicate to one or more devices to modify its operating power levels. The modification signal may be sent to each system device. Each system device may then modify its operating power levels in accordance with the modification signal.

There are several ways in which the operating power levels of a device may be modified. In one embodiment of the invention, the amount of modification may be predetermined. For example, if a device had a plurality of predefined operating power levels, the modification signal may indicate which level the device may use. In this example, if the device had only two predefined operating power levels, the modification signal may cause the device to switch between the two operating power levels. In this embodiment of the invention, the presence of the modification signal may be sufficient to cause the device to switch between operating power levels. If the device had three or more predefined operating power levels, the modification signal may also indicate which operating power level the device should use.

In another embodiment of the invention, a device may not have predefined levels of operating power levels. For example, the device may have a minimum operating power level, but may operate at various levels of efficiency above this minimum operating power level based on the amount of available power. In this case, the modification signal may indicate an amount by which the device should modify its current operating power level. The modification signal may also indicate whether the device should increase or decrease its current operating power level by the received amount.

Figure 2:
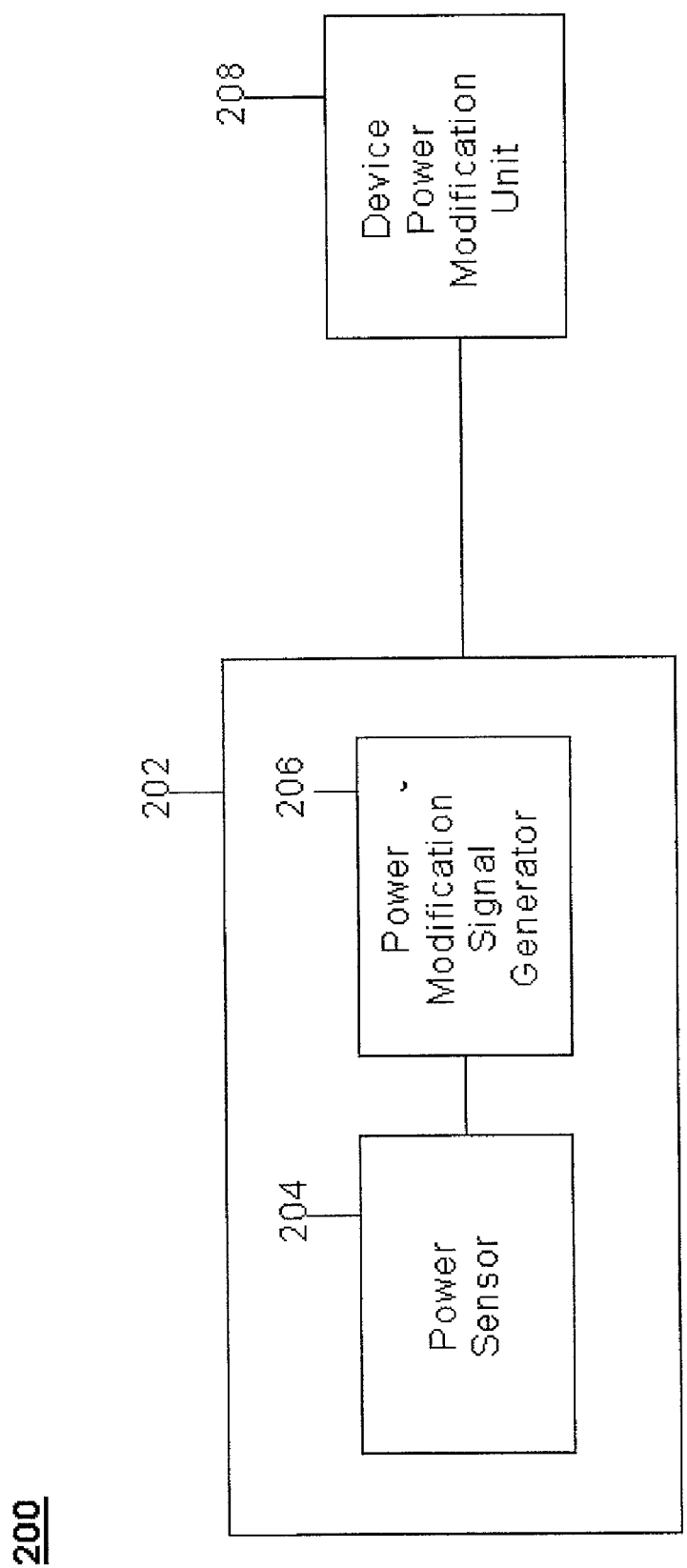
FIG. 2 is a block diagram of a system in accordance with one embodiment of the invention.

FIG. 2 is a block diagram of a system in accordance with one embodiment of the invention. FIG. 2 illustrates a system 200. System 200 may comprise a system power modification unit 202 and a device power modification unit 208. System power modification unit 202 may be representative of, for example, system power modification unit 104. Device power modification unit 208 may comprise a part of each system device, such as system devices 106, 108, 110 and 112, for example. Device power modification unit 308 may also be a single component connected to and shared by system devices 106, 108, 110 and 112.

As shown in FIG. 2, system power modification unit may comprise a power sensor 204 and a power modification signal generator 206. Power sensor 204 may be connected to a power supply to monitor power levels for the power supply. An example of a power supply might be power supply 102. Power sensor 204 may receive signals from the power supply on a continuous or periodic basis. Power sensor 204 may be configured to detect changes in the power levels of the power supply by sampling the received signals. Power sensor 204 may also be configured to detect an amount of change in the power level of the power supply. The change may be measured several ways, such as against a predefined power level for the power supply, a measured average power level over a certain time period for the power supply, one or more previous samples, and so forth. The change may be represented as an absolute or percentage value, depending on a particular system design. In one embodiment of the invention, the power sensor may detect the current power level of the power supply rather than the amount of change in the power level of the power supply.

Once power sensor 204 detects a change in power supply power levels, power sensor 204 may send a signal to power modification signal generator 306. In one embodiment of the invention, the signal may indicate a change in power levels for the power supply. In another embodiment of the invention, the signal may also include an indication of the amount of change in power as well, for example. In yet another embodiment of the invention, the signal may also include an indication of the current power level of the power supply.

Power modification signal generator 306 may operate to receive the signal from power sensor 304. Power modification signal generator 306 may then generate a modification signal based on the signal, including the indicator for the amount of change in power levels, or the current power level of the power supply, if included.

Power modification signal generator 306 may be configured to generate the modification signal in a number of desired ways. In one embodiment of the invention, power modification signal generator 306 may generate the modification signal to indicate each device should reduce its operating power levels by the same amount. The amount may be calculated by power modification signal generator 306 based on a predetermined formula using the signal from power sensor 304 as partial inputs. The amount may also be retrieved from a power table. The power table may have predetermined reduction in power levels associated with each device based on the change in power levels in the power supply or the current power level of the power supply. In one embodiment of the invention, power modification signal generator may receive the signal from power sensor 304, retrieve the amount of change in power levels from the signal, and search the power table by the amount of change in power levels. In this embodiment of the invention, the power table may have a predefined value associated with each change in power level, with the predefined value representing the amount of modification required for all devices within the system. In one embodiment of the invention, the value may be a percentage of the amount of change in power levels of the power supply. In another embodiment of the invention, the value may be an absolute value associated with each change in power level.

In one embodiment of the invention, the power table may be organized, managed and searched based on the current power level of the power supply as well. The power table may have a list of devices, and associated operating power levels, organized by the potential currently power level of the power supply. In this case, power sensor 304 may determine the current power level of the power supply, and provide this information to power modification signal generator 306. Power modification signal generator 306 may then search the power table by the current power level of the power supply, and retrieve a list of devices and their associated operating power levels. The modification signal may provide this information to the list of devices, and each device may ensure that they are operating at the appropriate operating power level.

In one embodiment of the invention, power modification signal generator 306 may generate the modification signal to indicate that some or all of the system devices need to modify its operating power level by varying amounts. The power table may be organized by changes in power levels of the power supply or by the current power level of the power supply, with each change in power level or current power level having a corresponding number of devices that may need modifications to their operating power levels, and the amount of modification desired. Power modification signal generator 306 may select the corresponding number of devices randomly, or by an order of priority as set forth in the power table. The order of priority may be based on any number of factors, including the type of functions performed by the device, the operating power levels for the device, the capability of performing on reduced operating power levels for the device, the need of the device, and so forth. In addition, the selection of devices as set forth in the power table may be updated according to external factors, such as time of day, date, current draw of operating power, and so forth. For example, some devices may be more critical during the day rather than the night. In such a case, the power table may have a value associated with the time of day. In another example, some devices may be more critical during certain periods of the month. In such a case, the power table may have a value associated with the date or season.

Device power modification unit 308 may be configured to receive the modification signal, and modify the operating power levels of two or more devices in accordance with the modification signal. An example of a device power modification unit 308 may comprise, for example, a device power modification unit based on the SpeedStep™ technology as built into the Pentium III mobile processors made by Intel Corporation. In one embodiment of the invention, the SpeedStep technology allows a mobile Pentium III processor to switch between performance modes. The switch between performance modes may be automatic based on the modification signal, or may be manually configured by a user. For example, in one performance mode the processor may operate at a speed of 700 megahertz (MHz), and an operating voltage of 1.6 volts. In another performance mode, the processor may operate at a speed of 600 MHz with an operating voltage of 1.35 volts. In another performance mode, the processor may draw even less power based on the level of activity of the processor. For example, in this mode the power requirements may be less than half a watt when the processor is inactive or when transitioning between performance modes. In another example, the processor may be placed in a "deep sleep" mode wherein the current configuration of the processor or device using the processor is saved and the processor is basically suspended until the operating power level may be increased to "reactivate" the processor. It can be appreciated that the Intel SpeedStep technology is only one example of the technology applicable for use as device power modification unit 308, and other technologies may be employed to modify the operating power levels of a device in accordance with a modification signal and still fall within the scope of the embodiments of the invention.

Figure 3:
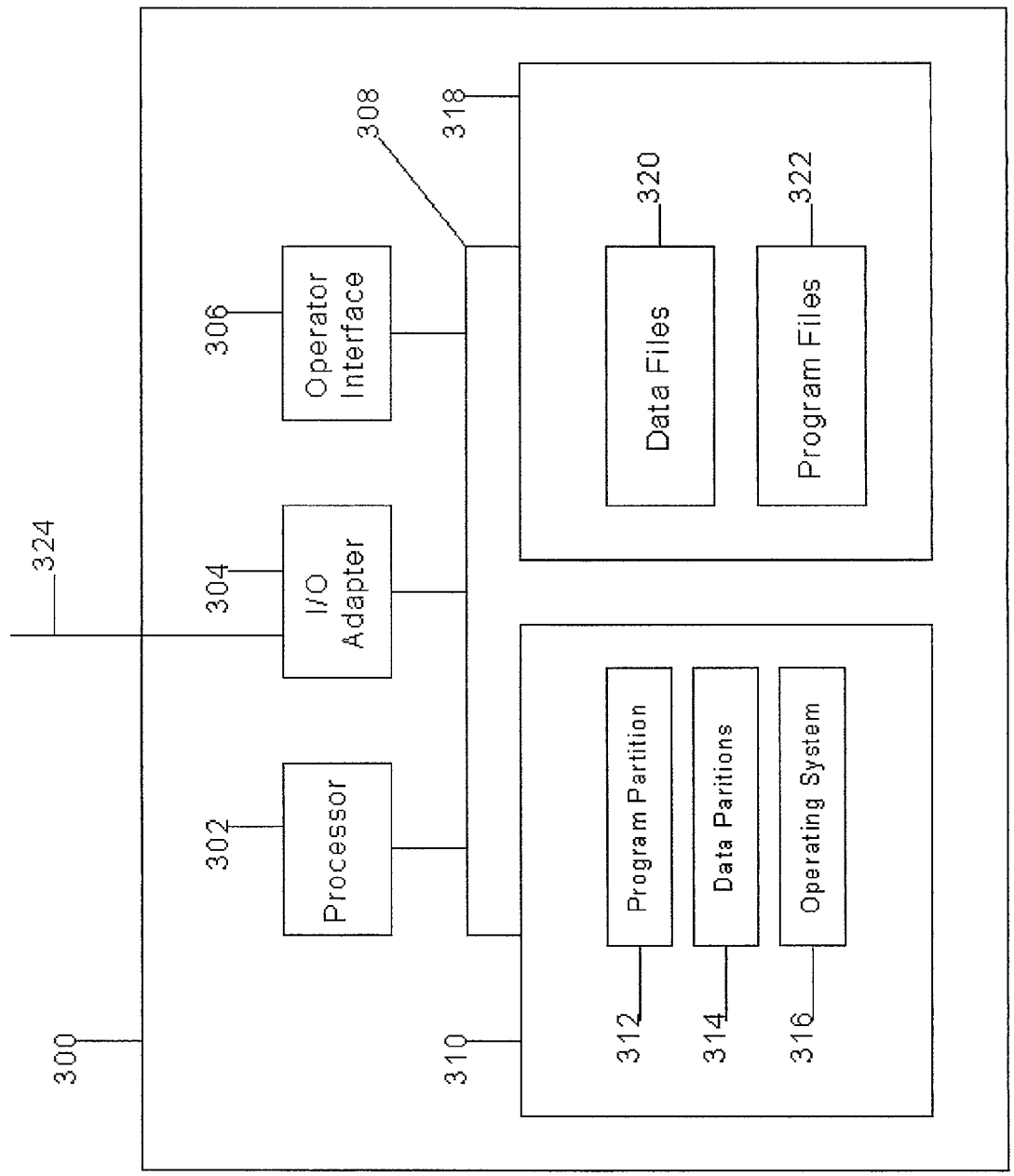
FIG. 3 is a block diagram of a system power modification unit in accordance with one embodiment of the invention.

FIG. 3 is a block diagram of a system power modification unit in accordance with one embodiment of the invention. FIG. 3 may illustrate a system 300 that may be representative of a system power modification unit in accordance with one embodiment of the invention. In this embodiment of the invention, system power modification unit 300 may be implemented in software. It can be appreciated, however, that the functionality for a system power modification unit may be implemented in hardware, software, or a combination of both, using conventional digital signal processing techniques.

FIG. 3 illustrates a system 300 that may include a processor 302, an input/output (I/O) adapter 304, an operator interface 306, a memory 310 and a disk storage 318. Memory 310 may store computer program instructions and data. The term "program instructions" may include computer code segments comprising words, values and symbols from a predefined computer language that, when placed in combination according to a predefined manner or syntax, cause a processor to perform a certain function. Examples of a computer language may include C, C++, JAVA and assembly. Processor 302 executes the program instructions, and processes the data, stored in memory 310. Disk storage 318 stores data to be transferred to and from memory 310. I/O adapter 304 communicates with other devices and transfers data in and out of the computer system over connection 324. Operator interface 306 may interface with a system operator by accepting commands and providing status information. All these elements are interconnected by bus 308, which allows data to be intercommunicated between the elements. I/O adapter 304 represents one or more I/O adapters or network interfaces that can connect to a network, such as a LAN or WAN. Therefore, connection 324 may represent a network or a direct connection to other equipment.

Processor 302 can be any type of processor capable of providing the speed and functionality required by the embodiments of the invention. For example, processor 302 could be a processor from family of processors made by Intel Corporation, Motorola Incorporated, Sun Microsystems Incorporated, Compaq Computer Corporation and others. Processor 302 may also comprise a digital signal processor (DSP) and accompanying architecture, such as a DSP from Texas Instruments Incorporated.

In one embodiment of the invention, memory 310 and disk storage 318 may comprise a machine-readable medium and may include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM) and any other media that may store digital information. In one embodiment of the invention, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, system 300 may contain various combinations of machine-readable storage devices through various I/O controllers, which are accessible by processor 302 and which are capable of storing a combination of computer program instructions and data.

Memory 310 is accessible by processor 302 over bus 308 and includes an operating system 316, a program partition 312 and a data partition 314. In one embodiment of the invention, operating system 316 may comprise an operating system sold by Microsoft Corporation, such as Microsoft Windows® 95, 98, 2000 and NT, for example. Program partition 312 stores and allows execution by processor 302 of program instructions that implement the functions of each respective system described herein. Data partition 314 is accessible by processor 302 and stores data used during the execution of program instructions. Program files and data files may also be stored in memory 318 as part of program files 322 and data files 320, respectively, as needed.

In one embodiment of the invention, program partition 312 contains program instructions that will be collectively referred to herein as a system power modification unit module. This module may perform the function of generating the modification signal as described herein. Of course, the scope of the invention is not limited to this particular set of instructions.

I/O adapter 304 may comprise a network adapter or network interface card (NIC) configured to operate with any suitable technique for controlling communication signals between computer or network devices using a desired set of communications protocols, services and operating procedures, for example. I/O adapter 304 also includes appropriate connectors for connecting I/O adapter 304 with a suitable communications medium. I/O adapter 304 may receive communication signals over any suitable medium such as copper leads, twisted-pair wire, co-axial cable, fiber optics, radio frequencies, and so forth.

The operation of systems 100, 200 and 300 may be further described with reference to FIG. 4 and accompanying examples. Although FIG. 4 as presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 4:
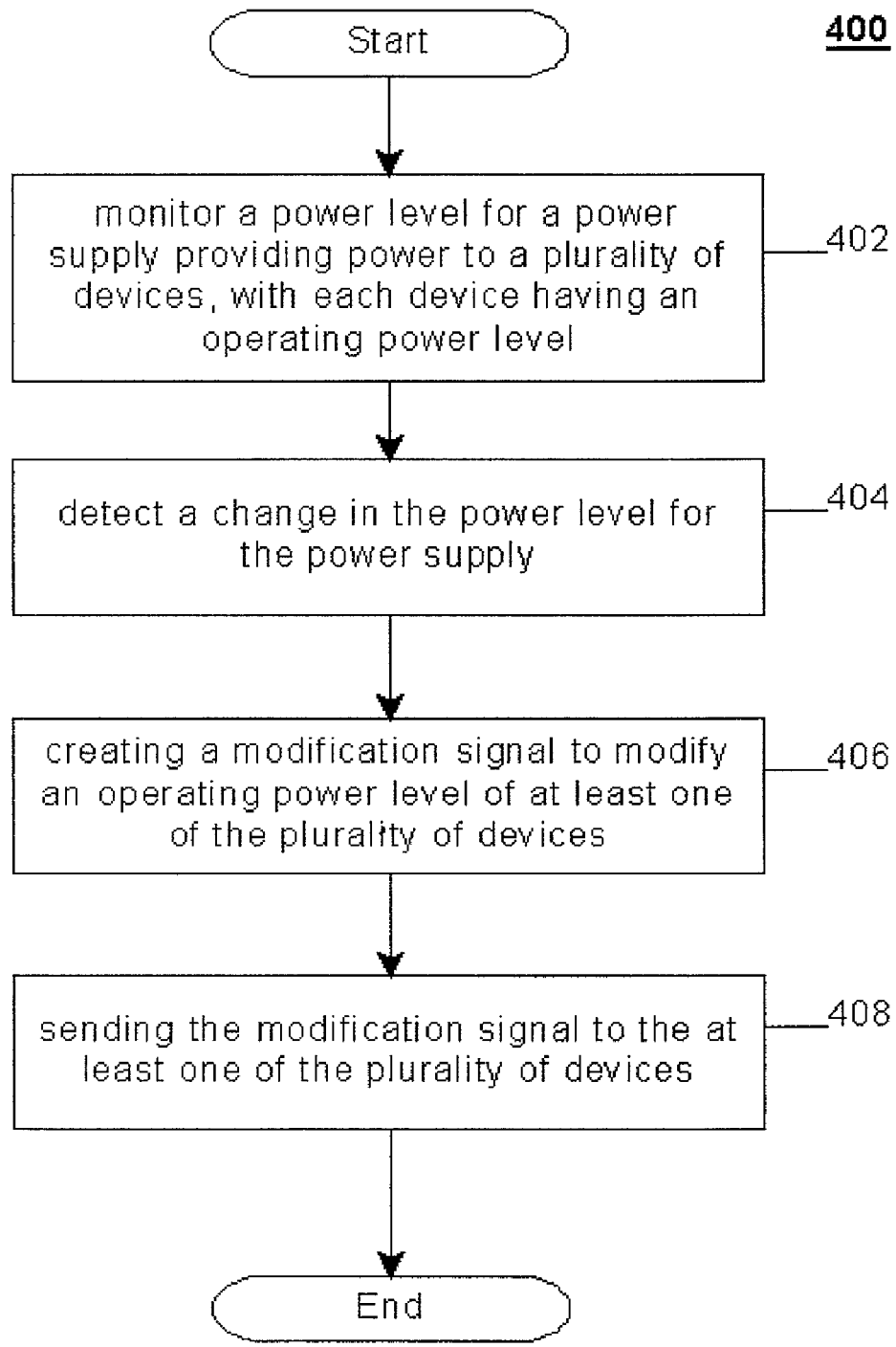
FIG. 4 is a block flow diagram of operations performed by a system power modification unit in accordance with one embodiment of the invention.

FIG. 4 is a block flow diagram of the programming logic performed by a system power modification unit module in accordance with one embodiment of the invention. FIG. 4 illustrates a programming logic 400. FIG. 4 illustrates a method to modify power to a system. A power level for a power supply may be monitored at block 402. The power supply may provide power to a plurality of devices. Each device may have an operating power level. A change in the power level for the power supply may be detected at block 404. A modification signal to modify an operating power level of at least one of the plurality of devices may be created at block 406. The modification signal may be sent to the at least one of the plurality of devices at block 408.

In one embodiment of the invention, the modification signal may be received by the at least one of the plurality devices. The receiving device may then modify its operating power level in accordance with the modification signal. In one embodiment of the invention, the modification signal may indicate that the receiving device should reduce its operating power level. In another embodiment of the invention, the modification signal may indicate that the receiving device should increase its operating power level.

In one embodiment of the invention, the modification signal may be created as follows. A particular device may be selected to modify its operating power level. An amount to modify the operating power level may be determined. The modification signal to modify the operating power level of the selected device may be created using the determined amount.

In one embodiment of the invention, a device may be selected by detecting an amount of change in the power level for the power supply. The amount of change may be used to search a power table. The power table may have one or more devices associated with a particular amount of change. The associated devices may be retrieved from the power table using the amount of change. In addition, the power table may have an amount to modify the operating power level of each device. Therefore, once the devices are selected, an amount to modify the operating power level for each selected device may also be retrieved from the power table.

In one embodiment of the invention, the devices selected for modification of their operating power levels may receive the modification signal. Each device may determine an amount to modify its operating power level. This determination may be made by information provided by the modification signal. This determination may also be made by information retrieved from memory, such as a power table for the devices. Each device may then modify its operating power level in accordance with the determination.

The operation of systems 100, 200, 300 and the flow diagram shown in FIG. 4 may be better understood by way of example. In this example, power supply 102 of system 100 may provide power to devices 106, 108, 110 and 112. Power supply 102 may receive its power from a power generation grid through an AC outlet, for example. System power modification unit 104 may monitor the power levels for power supply 102 via power sensor 204. Power sensor 204 may detect a drop in power level for power supply 102. The drop may occur for various reasons, such as a brownout condition in the power generation grid. Power sensor 204 may send a signal to power modification signal generator 206 of system power modification unit 104. The signal may indicate the drop in power level for power supply 102.

Power modification signal generator 206 may generate a modification signal for one or more devices 106, 108, 110 or 112. In one example, assume that devices 106, 108, 110 and 112 have two operating power levels. Assume the first operating power level is 1.6 volts, and the second operating power level is 1.35 volts. Power modification signal generator 206 may first determine which of devices 106, 108, 110 or 112 it will select to modify its operating power levels. It may utilize a power table to make this selection. An example of a power table is shown in Table 1.

TABLE 1

| Current Power Level | Devices | Operating Power Levels |
|---|---|---|
| Power Level 1 | 106, 108, 110, 112 | 1.6 volts |
| Power Level 2 | 106, 108, 110 | 1.6 volts |
| | 112 | 1.35 volts |
| Power Level 3 | 106, 108 | 1.6 volts |
| | 110, 112 | 1.35 volts |

TABLE 1-continued

| Current Power Level | Devices | Operating Power Levels |
|---|---|---|
| Power Level 4 | 106 | 1.6 volts |
| | 108, 110, 112 | 1.35 volts |
| Power Level 5 | 106, 108, 110, 112 | 1.35 volts |
| Power Level 6 | 106, 108, 110 | 1.35 volts |
| | 112 | 0 volts (shut down) |

As shown in Table 1, each power level from 1–6 may identify a set of devices and the appropriate operating power level for each device. In this example, power level 1 is the highest power level and power level 6 is the lowest power level for a power supply. Values for power levels 1–6 may be any range of values appropriate to a particular power supply. Power modification signal generator 206 may receive a signal from power sensor 204 indicating that a change in power level for power supply 102 has occurred. In addition, the signal may indicate that the current power level of the power supply is power level 3. Power modification signal generator 206 may search a power table such as Table 1 using power level 3. The power table indicates that at power level 3, devices 106 and 108 should have an operating power level of 1.6 volts, and devices 110 and 112 should have an operating power level of 1.35 volts. Power modification signal generator 206 may then generate a modification signal indicating the information retrieved from the power table. Power modification signal generator 206 may then send the modification signal to devices 106, 108, 110 and 112.

Device power modification unit 208 for devices 106, 108, 110 and 112 may receive the modification signal. Each device may then modify its operating power level in accordance with the modification signal. In this example, device power modification unit 208 for device 106 may determine from the modification signal that its current operating power level should be 1.6 volts. Device power modification unit 208 may then instruct device 106 to increase or decrease its operating power level to 1.6 volts, depending on the current operating power level of device 106. For example, if the current operating power level of device 106 is 1.35 volts due to a previous decrease in operating power level, device 106 may increase its operating power level to 1.6 volts in accordance with the modification signal. Devices 108, 110 and 112 may operate similarly in modifying their current operating power levels in accordance with the information provided by the modification signal.

In the example of the power table given in Table 1, it may be worthy to note that power level 6 indicates that devices 106, 108 and 110 may need to operate at 1.35 volts, while device 112 may need to shut down entirely to reduce power requirements for system 100. Power level 6 may indicate, for example, a power level incapable of sustaining all the devices of system 100, and therefore requiring certain devices to draw less power and for some devices no power at all. This may be an example of determining the sequence of device power reductions and shut downs based on various predetermined factors, as reflected by the particular configuration of the power table.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to modify power to a system, comprising:
    monitoring a power level for a power supply providing power to a plurality of devices stored in a physical rack, with each device having an operating power level and a priority factor;
    detecting a change in said power level for said power supply;
    creating a modification signal, based on a change in said power level of said power supply, to modify an operating power level of at least one of said plurality of devices from a first operating power level to a second operating power level, said second operating level based on an amount of change in said power level and said priority factor; and
    sending said modification signal to said at least one of said plurality of devices.

2. The method of claim 1, further comprising:
    receiving said modification signal at said at least one of said plurality of devices; and
    modifying said operating power level for said at least one of said plurality of devices in accordance with said modification signal.

3. The method of claim 2, wherein said modifying comprises reducing said operating power level for said at least one of said plurality of devices in accordance with said modification signal.

4. The method of claim 2, wherein said modifying comprises increasing said operating power level for said at least one of said plurality of devices in accordance with said modification signal.

5. The method of claim 1, wherein said creating comprises:
    selecting said at least one of said plurality of devices;
    determining an amount to modify said operating power level of said at least one of said plurality of devices; and
    creating said modification signal to modify said operating power level for said at least one of said plurality of devices using said amount.

6. The method of claim 5, wherein said detecting comprises detecting a current power level for said power supply.

7. The method of claim 6, wherein said selecting comprises retrieving said at least one of said plurality of devices from a power table using said current power level.

8. The method of claim 6, wherein said determining said amount to modify comprises retrieving said amount to modify from said power table associated with said at least one of said plurality of devices.

9. A method to modify power to a system, comprising:
    receiving a modification signal, based on a change to a power level of a power supply, to modify an operating power level for a device of a plurality of devices stored in a physical rack and connected to a power supply from a first operating power level to a second operating power level, said second operating level based on an amount of change in said power level and a priority factor of said device;
    determining an amount to modify said device; and
    modifying said operating power level in accordance with said determination.

10. The method of claim 9, wherein said determining comprises retrieving said amount from a power table.

11. The method of claim 9, wherein said determining comprises retrieving said amount from said modification signal.

12. An apparatus, comprising:
a power supply to provide power at a power supply power level;
a plurality of devices stored in a physical rack and connected to said power supply, said plurality of devices to operate at an operating power level; and
a system power modification unit connected to said power supply and said plurality of devices, said power modification unit to detect a change in said power supply power level and to modify said operating power level of at least one of said plurality of devices from a first operating power level to a second operating power level, said second operating level based on an amount of change in said power level and a priority factor of said device.

13. The apparatus of claim 12, wherein said system power modification unit comprises:
a power sensor to detect said change; and
a power modification signal generator connected to said power sensor to generate said modification signal when said power sensor detects said change.

14. The apparatus of claim 13, wherein said power modification signal generator generates said modification signal to indicate an amount to modify said operating power levels.

15. The apparatus of claim 13, wherein said power modification signal generator generates said modification signal to indicate a reduction in said operating power levels.

16. The apparatus of claim 13, wherein said power modification signal generator generates said modification signal to indicate an increase in said operating power levels.

17. The apparatus of claim 12, further comprising a device power modification unit to receive said modification signal, and to modify said operating power levels in accordance with said modification signal.

18. An article comprising:
a storage medium;
said storage medium including stored instructions that, when executed by a processor, result in modifying power to a system by monitoring a power level for a power supply providing power to a plurality of devices stored in a physical rack, with each device having an operating power level and a priority factor, detecting a change in said power level for said power supply, creating a modification signal, based on said change in said power level, to modify an operating power level of at least one of said plurality of devices from a first operating power level to a second operating power level, said second operating level based on an amount of change in said power level and said priority factor, and sending said modification signal to said at least one of said plurality of devices.

19. The article of claim 18, wherein the stored instructions, when executed by a processor, further result in receiving said modification signal at said at least one of said plurality of devices, and modifying said operating power level for said at least one of said plurality of devices in accordance with said modification signal.

* * * * *